United States Patent
Roh et al.

(10) Patent No.: US 9,053,019 B2
(45) Date of Patent: Jun. 9, 2015

(54) NON-VOLATILE MEMORY DEVICE, A DATA PROCESSING DEVICE USING THE SAME, AND A SWAPPING METHOD USED BY THE DATA PROCESSING AND NON-VOLATILE MEMORY DEVICES

(75) Inventors: Yang Woo Roh, Hwaseong-si (KR); Min Chan Kim, Suwon-si (KR); Joo Young Hwang, Suwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 469 days.

(21) Appl. No.: 13/439,349

(22) Filed: Apr. 4, 2012

(65) Prior Publication Data

US 2012/0254520 A1 Oct. 4, 2012

(30) Foreign Application Priority Data

Apr. 4, 2011 (KR) .................. 10-2011-0030590

(51) Int. Cl.
*G06F 12/06* (2006.01)
*G06F 12/02* (2006.01)
*G06F 12/12* (2006.01)

(52) U.S. Cl.
CPC .......... *G06F 12/0638* (2013.01); *G06F 12/023* (2013.01); *G06F 2212/2022* (2013.01); *G06F 12/126* (2013.01)

(58) Field of Classification Search
CPC .................. G06F 12/0638; G06F 12/126
USPC .................. 711/103; 365/185.33
See application file for complete search history.

(56) References Cited

U.S. PATENT DOCUMENTS

| | | | |
|---|---|---|---|
| 6,223,266 B1 * | 4/2001 | Sartore ..................... | 711/170 |
| 7,171,516 B2 | 1/2007 | Lowe et al. | |
| 7,565,563 B2 | 7/2009 | Gappisch et al. | |
| 7,624,240 B1 * | 11/2009 | Colbert et al. ............ | 711/159 |
| 2010/0250833 A1 * | 9/2010 | Trika ........................ | 711/103 |
| 2010/0312955 A1 * | 12/2010 | Hwang et al. ............ | 711/105 |
| 2012/0191938 A1 * | 7/2012 | Uwatoko ................. | 711/170 |

FOREIGN PATENT DOCUMENTS

| | | |
|---|---|---|
| JP | 2009-282603 | 12/2009 |
| KR | 1020100067248 | 6/2010 |

* cited by examiner

*Primary Examiner* — Reginald Bragdon
*Assistant Examiner* — Mehdi Namazi
(74) *Attorney, Agent, or Firm* — F. Chau & Associates, LLC (57) ABSTRACT

A swapping method performed using a data processing device, which includes a processor including a plurality of cores, the swapping method including searching for an empty page of a swap memory in response to the swap memory being connected to the data processing device, the search being performed by using at least one core of the plurality of cores, selecting a page to be swapped from a main memory of the data processing device, the selection being performed by using the at least one core by accessing a corresponding main memory list among a plurality of main memory lists, and swapping data of the page selected to be swapped to the empty page, the swapping being performed by using the at least one core.

15 Claims, 7 Drawing Sheets

FIG. 7

NON-VOLATILE MEMORY DEVICE, A DATA PROCESSING DEVICE USING THE SAME, AND A SWAPPING METHOD USED BY THE DATA PROCESSING AND NON-VOLATILE MEMORY DEVICES

CROSS-REFERENCE TO RELATED APPLICATION

This application claims priority under 35 U.S.C. §119(a) to Korean Patent Application No. 10-2011-0030590 filed on Apr. 4, 2011, the disclosure of which is incorporated by reference herein in its entirety.

BACKGROUND

1. Technical Field

The present inventive concept relates to a data swapping method and a data processing device and a non-volatile memory device that perform the data swapping method.

2. Discussion of the Related Art

An operating system (OS) deals with limitations in the capacity of a main memory (e.g., a random access memory (RAM)) by using a virtual memory. For this, the operating system uses a hard disk drive (HDD) as a swap memory. In other words, when there is lack of space in a main memory due, for example, to the simultaneous loading of applications, some data inside the main memory are swapped (e.g., written or copied) to the HDD.

However, it can be inefficient to use a non-volatile memory device (e.g., a flash memory device) as a swap memory. This is because the flash memory device has a faster access speed than the HDD and performs complex functions such as wear leveling or garbage collection.

SUMMARY

An exemplary embodiment of the present inventive concept is directed to a swapping method, which is a method performed using a data processing device including a processor including a plurality of cores, the swapping method comprising searching for an empty page of a swap memory in response to the swap memory being connected to the data processing device, wherein the search is performed by using at least one core of the plurality of cores, selecting a page to be swapped from a main memory of the data processing device, wherein the selection is performed by using the at least one core by accessing a corresponding main memory list among a plurality of memory lists, and swapping data of the page selected to be swapped to the empty page, wherein the swapping is performed by using the at least one core.

The swapping method may further include updating a page table storing information about the page to be swapped, wherein the updating is performed by using the at least one core.

At least one of the plurality of main memory lists may be updated in a round robin method.

At least one of the plurality of main memory lists may be a least recently used (LRU) list.

The swapping includes transmitting at least two requests to the swap memory, and then, transmitting a next request to the swap memory, wherein the next request is transmitted in accordance with a waiting time that is based on a continuity of a swap memory address included in each of the at least two requests, wherein the at least two requests and the next request are transmitted by using the at least one core.

In addition, the swapping includes transmitting a request to the swap memory, and then, transmitting a next request to the swap memory, wherein the next request is transmitted in accordance with a waiting time that is based on an expected busy time output from the swap memory, wherein the two requests are transmitted by using the at least one core.

The swap memory is attachable or detachable to/from the data processing device.

An exemplary embodiment of the present inventive concept is directed to a non-volatile memory device that includes a memory cell array including a plurality of pages, a register configured to store an expected busy time and a controller configured to supply the expected busy time to a data processing device in response to a control signal received from the data processing device. The data processing device may determine a waiting time for transmitting a request to the non-volatile memory device based on the expected busy time in response to the non-volatile memory device being connected to the data processing device.

The non-volatile memory device may be a universal serial bus (USB) memory device.

The non-volatile memory device may be attachable or detachable to/from the data processing device.

An exemplary embodiment of the present inventive concept is directed to a data processing device, including a main memory and a processor including a plurality of cores. In response to a swap memory being connected to the data processing device, at least one of the plurality of cores may search for an empty page of the swap memory, select a page to be swapped from the main memory by accessing a corresponding main memory list among a plurality of main memory lists, and swap data of the page selected to be swapped to the empty page.

At least one of the main memory lists is a least recently used (LRU) list.

At least one of the plurality of main memory lists is updated in a round robin method.

The at least one core may determine a waiting time and transmit a request to the swap memory to swap the data to the empty page in accordance with the waiting time, wherein the waiting time is based on a continuity of a swap memory address included in each of a plurality of requests transmitted in advance of the request.

The at least one core may determine a waiting time and transmit a request to the swap memory to swap the data to the empty page in accordance with the waiting time, wherein the waiting time is based on an expected busy time output from the swap memory.

According to an exemplary embodiment of the present inventive concept, there is provided a data swapping method of a data processing device that includes a multi-core processor and a working memory, the method including: receiving, at the data processing device, the identity of a data storage space in a swap memory communicably coupled to the data processing device; locating, by using a first core of the multi-core processor, a page in the working memory whose data is to be inserted into the data storage space in the swap memory; and outputting, from the data processing device, the data of the page to the swap memory.

The working memory may include volatile memory.

The swap memory may include non-volatile memory.

The first core may use a list that identifies pages in the working memory to locate the page.

The method may further include receiving, at the data processing device, a busy time signal from the swap memory, and in response thereto, adjusting, at the data processing device, a speed by which the data of the page is output to the swap memory.

BRIEF DESCRIPTION OF THE DRAWINGS

The above and/or other aspects of the present inventive concept will become more apparent by describing in detail exemplary embodiments thereof with reference to the accompanying drawings in which.

DETAILED DESCRIPTION OF THE EMBODIMENTS

Exemplary embodiments of the present inventive concept will be described more fully hereinafter with reference to the accompanying drawings. This inventive concept may, however, be embodied in many different forms and should not be construed as limited to the embodiments set forth herein. Like reference numbers may refer to like elements throughout the drawings and the following description.

It will be understood that when an element is referred to as being "connected" or "coupled" to another element, it can be directly connected or coupled to the other element or intervening elements may be present.

As used herein, the singular forms "a," "an" and "the" are intended to include the plural forms as well, unless the context clearly indicates otherwise.

Figure 1:
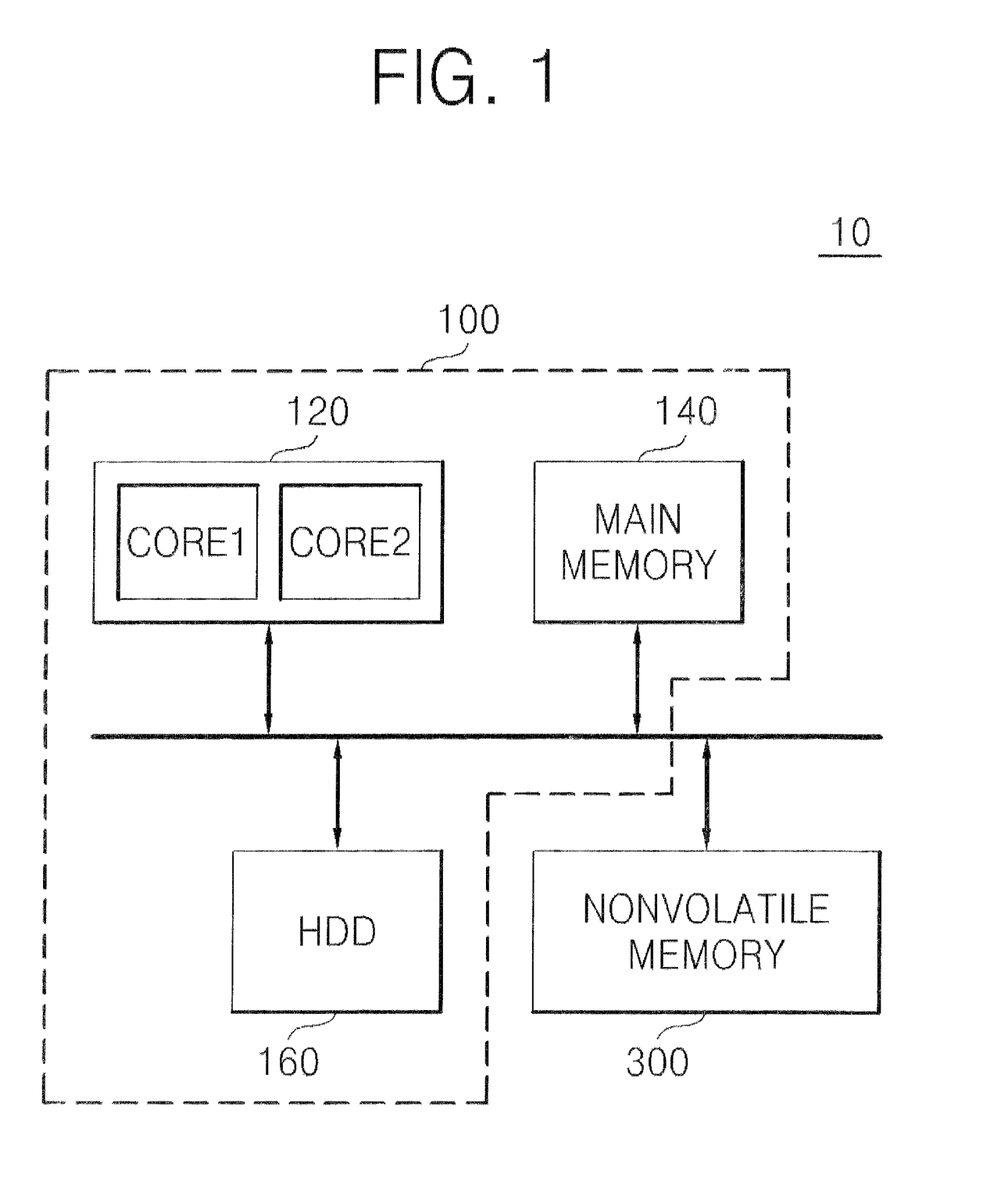
FIG. 1 is a block diagram of a data processing system according to an exemplary embodiment of the present inventive concept.

FIG. 1 is a block diagram of a data processing system 10 according to an exemplary embodiment of the present inventive concept. Referring to FIG. 1, the data processing system 10 includes a data processing device 100 and a non-volatile memory device 300. After the non-volatile memory device 300 is connected to the data processing system 10, the data processing system 10 may use the non-volatile memory device 300 as a swap memory. Hereinafter, the non-volatile memory device 300 may be referred to as the swap memory.

The data processing device 100 includes a processor 120, a main memory 140, and a hard disk drive (HDD) 160. The processor 120 processes data, reads data from the main memory 140 and the HDD 160, and writes data to the main memory 140 and the HDD 160.

The processor 120 includes a first core and a second core. The processor 120 illustrated in FIG. 1 includes two cores. However, the present inventive concept is not limited thereto. According to an exemplary embodiment of the present inventive concept, the processor 120 may include more than two cores.

At least one of the first core and the second core may search for an empty page of the non-volatile memory 300, e.g., a swap memory, select a page to be swapped from the main memory 140 by referring to a corresponding main memory list among a plurality of main memory lists, and swap data of the page selected to be swapped to the empty page. In addition, the at least one core may update a page table storing information about the page to be swapped.

The main memory 140 is a memory which may exchange data with the processor 120 and is used in a process of executing an operating system (OS) or an application which are performed in the processor 120. The main memory 140 (e.g., the working memory of the data processing device 100) may include a dynamic random access memory (DRAM).

Data stored in the HDD 160 does not disappear in the absence of power. In other words, the HDD 160 may be a non-volatile memory. The data of the HDD 160 is processed by the processor 120 after being loaded to the main memory 140.

The data processing device 100 may be embodied in a personal computer (PC), a tablet PC, a mobile computing device, a net book, etc.

The non-volatile memory device 300 may be used as a swap memory of the data processing device 100 after it is connected to the data processing device 100. In other words, the non-volatile memory device 300 is attachable or detachable to/from the data processing device 100.

The non-volatile memory device 300 may be embodied in a flash memory device, a smart card, a memory card, an exterior HDD, an exterior solid state drive (SSD), a mobile device, a navigator, a universal serial bus (USB) memory device, a phase change memory device, etc.

Figure 2:
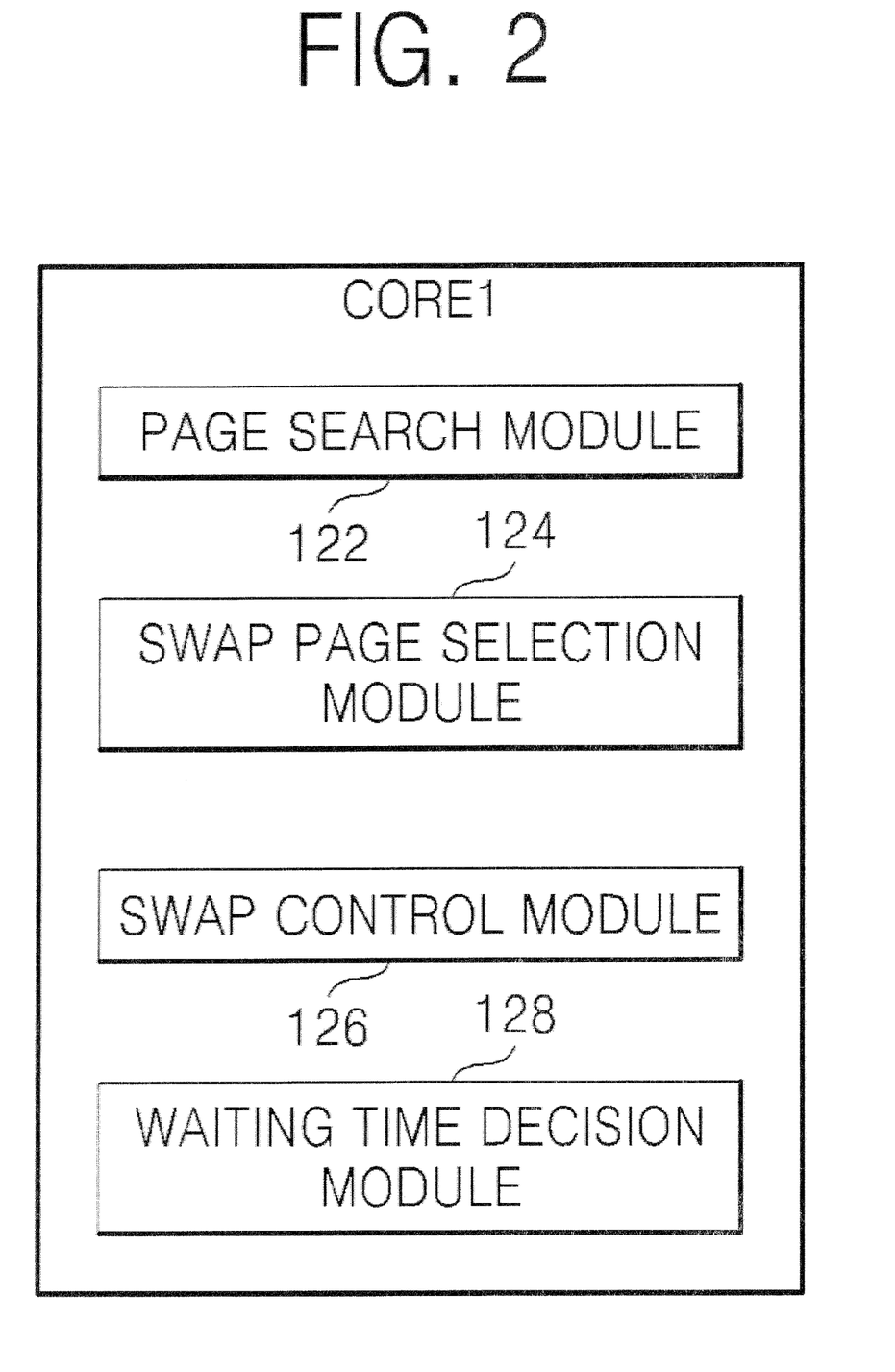
FIG. 2 is a block diagram of a first core illustrated in FIG. 1, according to an exemplary embodiment of the present inventive concept.

FIG. 2 is a block diagram of the first core illustrated in FIG. 1, according to an exemplary embodiment of the present inventive concept. Referring to FIG. 2, the first core includes a page search module 122, a swap page selection module 124, and a swap control module 126. The first core may further include a waiting time decision module 128.

The page search module 122 searches for an empty page of the non-volatile memory device 300, e.g., a swap memory, after the non-volatile memory device 300 is connected to the data processing device 100.

The swap page selection module 124 selects a page to be swapped from the main memory 140 by referring to a corresponding main memory list among a plurality of main memory lists. Here, each of the plurality of main memory lists may be a least recently used (LRU) list.

Additionally, the swap page selection module 124 may manage a main memory list, and update the main memory list when a new page is used. Here, the main memory list may be updated in a round robin method.

The swap control module 126 swaps data of the page selected to be swapped to the empty page. For this, the swap control module 126 may transmit a request to the swap memory 300. The request may include information about the page to be swapped and information about the empty page.

The waiting time decision module 128 may determine a waiting time for transmitting the request. In other words, the waiting time decision module 128 may determine a waiting time for transmitting a request based on the continuity of a swap memory address included in each of a plurality of requests transmitted in advance of the request.

Each configuration of the first core illustrated in FIG. 2 is such that it can be divided functionally and logically. However, each configuration may be divided into a separate physical device or made out of separate code.

In addition, a module in accordance with an exemplary embodiment of the present inventive concept may be a functional and structural combination between hardware for performing a feature of the present inventive concept and software for driving the hardware. For example, the module may be a logical unit of predetermined code and a hardware resource for executing the predetermined code. However, the module does not have to be predetermined code or a hardware resource for performing the predetermined code.

The configuration and operation of the second core illustrated in FIG. 1 may be substantially the same as the configuration and operation as the first core illustrated in FIG. 1, and thus a description thereof is omitted.

Figure 3:
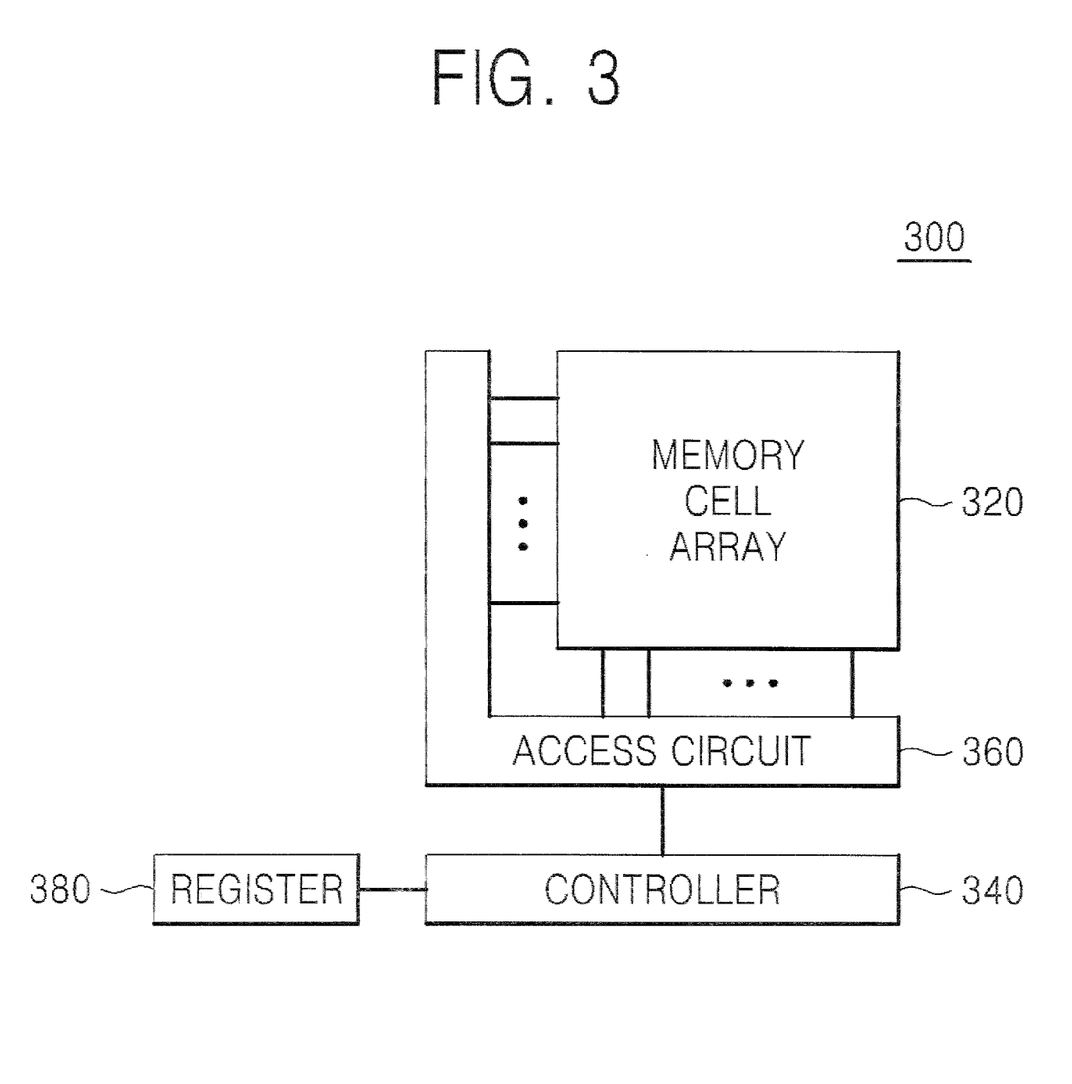
FIG. 3 is a block diagram of a non-volatile memory device illustrated in FIG. 1, according to an exemplary embodiment of the present inventive concept.

FIG. 3 is a block diagram of the non-volatile memory device 300 illustrated in FIG. 1, according to an exemplary embodiment of the present inventive concept. Referring to FIG. 3, the non-volatile memory device 300 may be used as a swap memory of the data processing device 100.

The non-volatile memory device 300 includes a memory cell array 320, a controller 340, and an access circuit 360. The non-volatile memory device 300 may further include a register 380.

The memory cell array 320 includes a plurality of pages. The controller 340 controls a read operation and a write operation of the non-volatile memory device 300. The controller 340 estimates an expected busy time and stores the estimated expected busy time in the register 380 when the non-volatile memory device 300 executes an unstoppable operation.

In addition, the controller 340 may supply the expected busy time in response to a control signal received from the data processing device 100. Accordingly, the data processing device 100 may adjust a waiting time for transmitting a request based on the expected busy time after the non-volatile memory device 300 is connected to the data processing device 100.

The access circuit 360 performs an access operation, e.g., a read operation, a write operation, a program operation, or an erase operation, in response to an access command of the controller 340. The expected busy time is stored in the register 380. Here, the expected busy time is synchronized to a clock and decreased.

Figure 4:
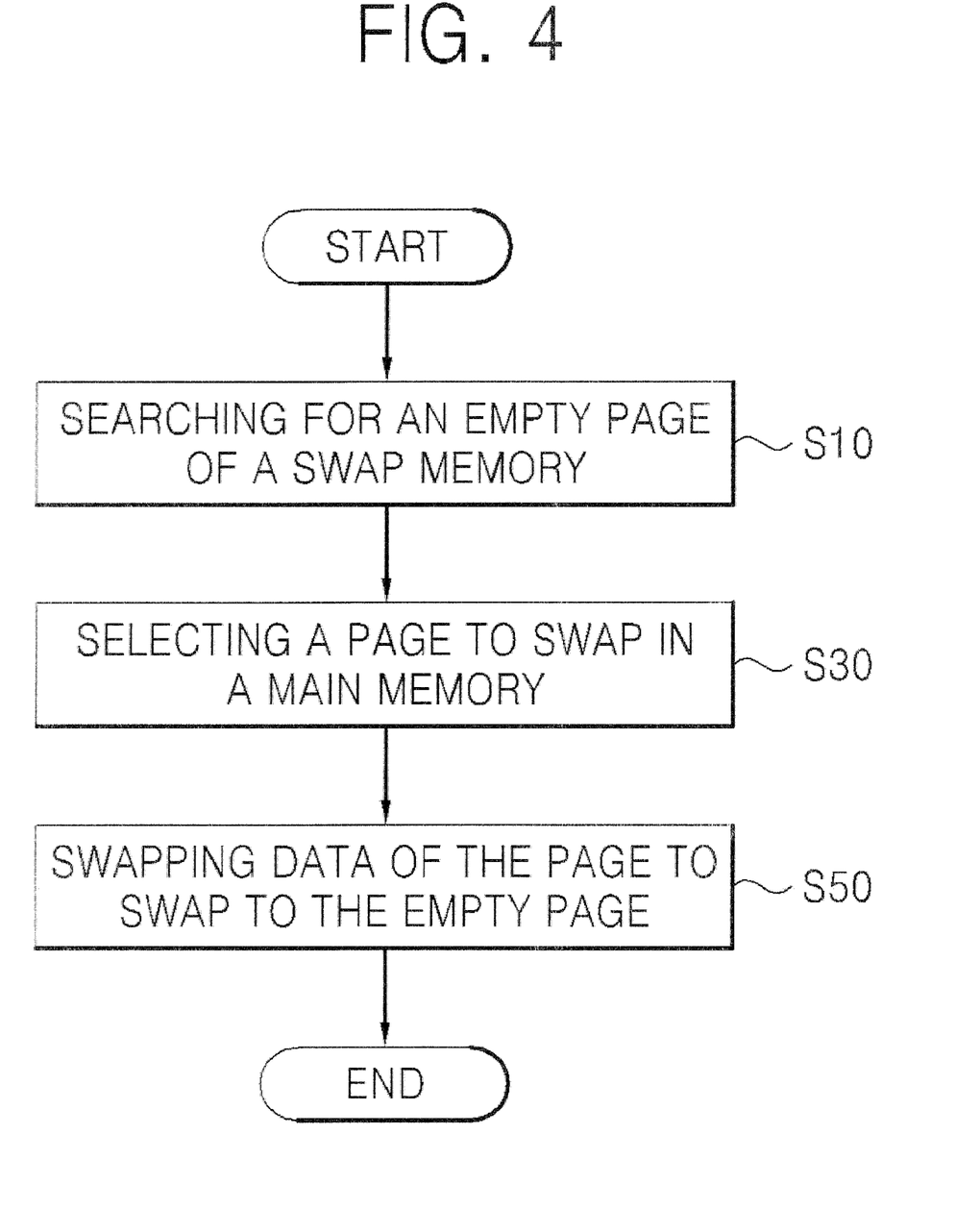
FIG. 4 is a flowchart of a swapping method according to an exemplary embodiment of the present inventive concept.

FIG. 4 is a flowchart of a swapping method according to an exemplary embodiment of the present inventive concept. Referring to FIG. 4, the swapping method is performed by using the data processing device 100, which includes the processor 120 including a plurality of cores, and, after the swap memory 300 is connected to the data processing device 100, at least one of the plurality of cores searches for an empty page of the swap memory 300 (S10).

The at least one core selects a page to be swapped from the main memory 140 by referring to a corresponding main memory list among a plurality of main memory lists (S30). The at least one core swaps data of the page selected to be swapped to the empty page (S50). Here, the swap memory 300 is attachable or detachable to/from the data processing device 100.

The swapping method may further include updating, by using the at least one core, a page table storing information about the page to be swapped. Here, the page table is a table recording which physical memory page a virtual memory page used in the data processing system 100 is mapped to.

For this, each of the plurality of cores may further include a memory management unit. When the data of the page to be swapped is swapped to the empty page, the memory management unit updates the page table reflecting this swap. In other words, the memory management unit updates the page table, which already includes information about the swapped page, so that it may include information about the empty page. Each of the plurality of main memory lists may be an LRU list. Additionally, each of the plurality of main memory lists may be updated in a round robin method.

Figure 5:
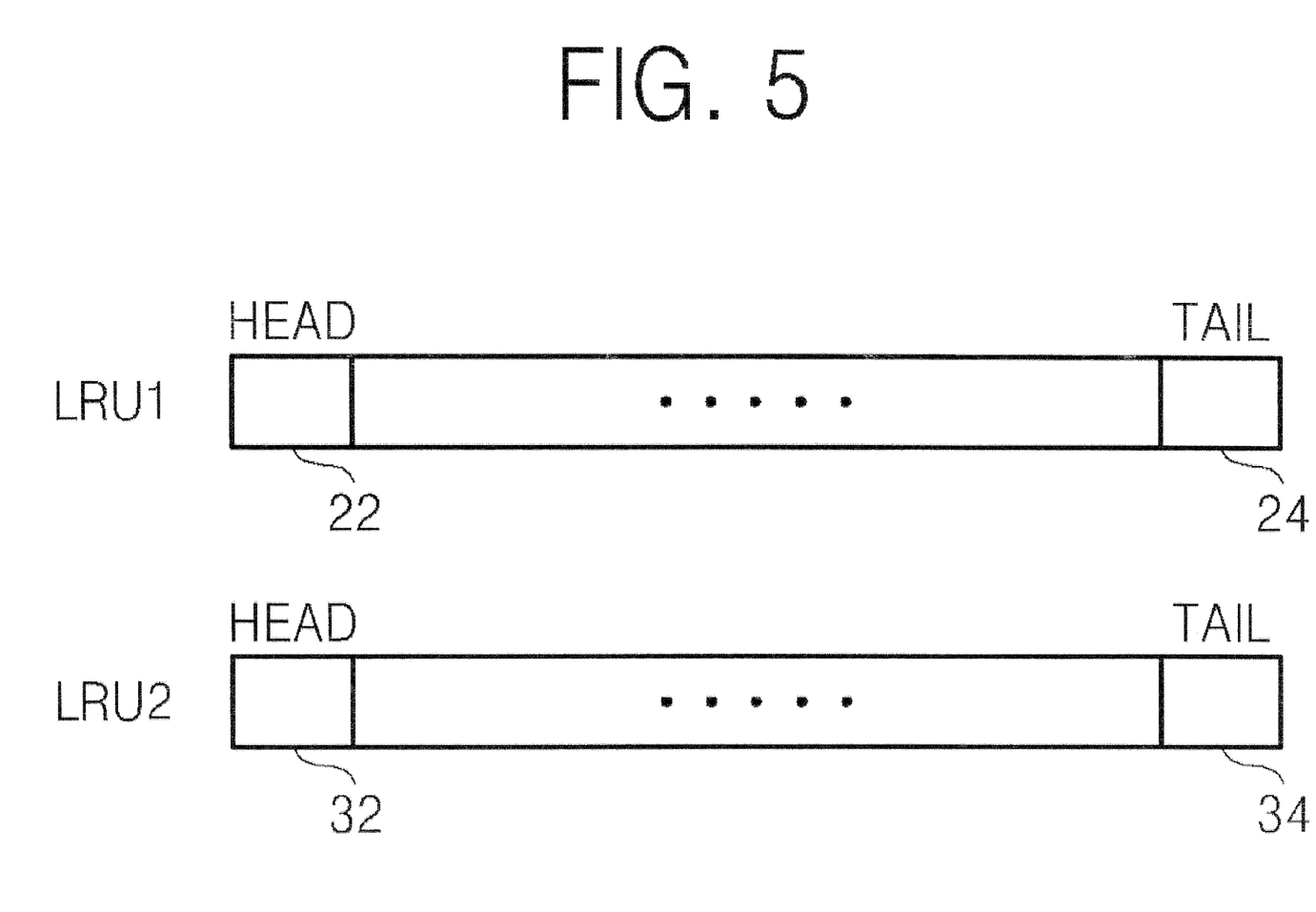
FIG. 5 illustrates a least recently used (LRU) table for explaining a round robin method used in the swapping method illustrated in FIG. 4, according to an exemplary embodiment of the present inventive concept.

FIG. 5 illustrates an LRU table for explaining the round robin method used in the swapping method illustrated in FIG. 4, according to an exemplary embodiment of the present inventive concept. Referring to FIG. 5, the number of LRU lists may be the same as the number of cores included in a processor. In other words, in the data processing system 10 which includes the processor 120 including two cores, there are two LRU lists.

Since each of the plurality of cores makes and manages its own LRU list, an error due to a single LRU list being accessed at the same time by two cores does not occur.

A first LRU list LRU1 is an LRU list corresponding to the first core of the processor 120 and a second LRU list LRU2 is an LRU list corresponding to the second core of the processor 120. In other words, the first core selects a page to be swapped by referring to the first LRU list LRU1 and the second core selects a page to be swapped by referring to the second LRU list LRU2.

In a head 22 of the first LRU list LRU1, a most recently used page among a plurality of pages included in the first LRU list LRU1 is located, and a most recently not used page, e.g., a least recently used page among the plurality of pages included in the first LRU list LRU1, is located in a tail 24 of the first LRU list LRU 1.

Likewise, a most recently used page among a plurality of pages included in the second LRU list LRU2 is located in a head 32 of the second LRU list LRU2, and a most recently not used page, e.g., a least recently used page among the plurality of pages included in the second LRU list LRU2, is located in a tail 34 of the second LRU list LRU2.

The first LRU list LRU1 and the second LRU list LRU2 are updated by a round robin method. For example, when a certain page of the main memory 140 is used, the first LRU list LRU1 is updated by adding that page to the head 22 of the first LRU list LRU1. Afterwards, when another page of the main memory 140 is used, the second LRU list LRU2 is updated by adding that page to the head 32 of the second LRU list LRU2. Thus, the first LRU list LRU1 and the second LRU list LRU2 take turns being updated. The first LRU list LRU1 is updated by the swap page selection module 124 included in the first core, and the second LRU list LRU2 is updated by a swap page selection module included in the second core.

Referring to FIG. 4 again, the at least one core transmits a request to the swap memory 300 to swap data of the page selected to be swapped to the empty page. However, when a transmitted request is not processed by the swap memory 300 and the request is stacked in a queue, a new request may be ignored. In addition, an operation speed of the swap memory 300 may become slow. Accordingly, a new request may be transmitted after an appropriate waiting time that takes into consideration a data processing speed of the swap memory 300.

Figure 6:
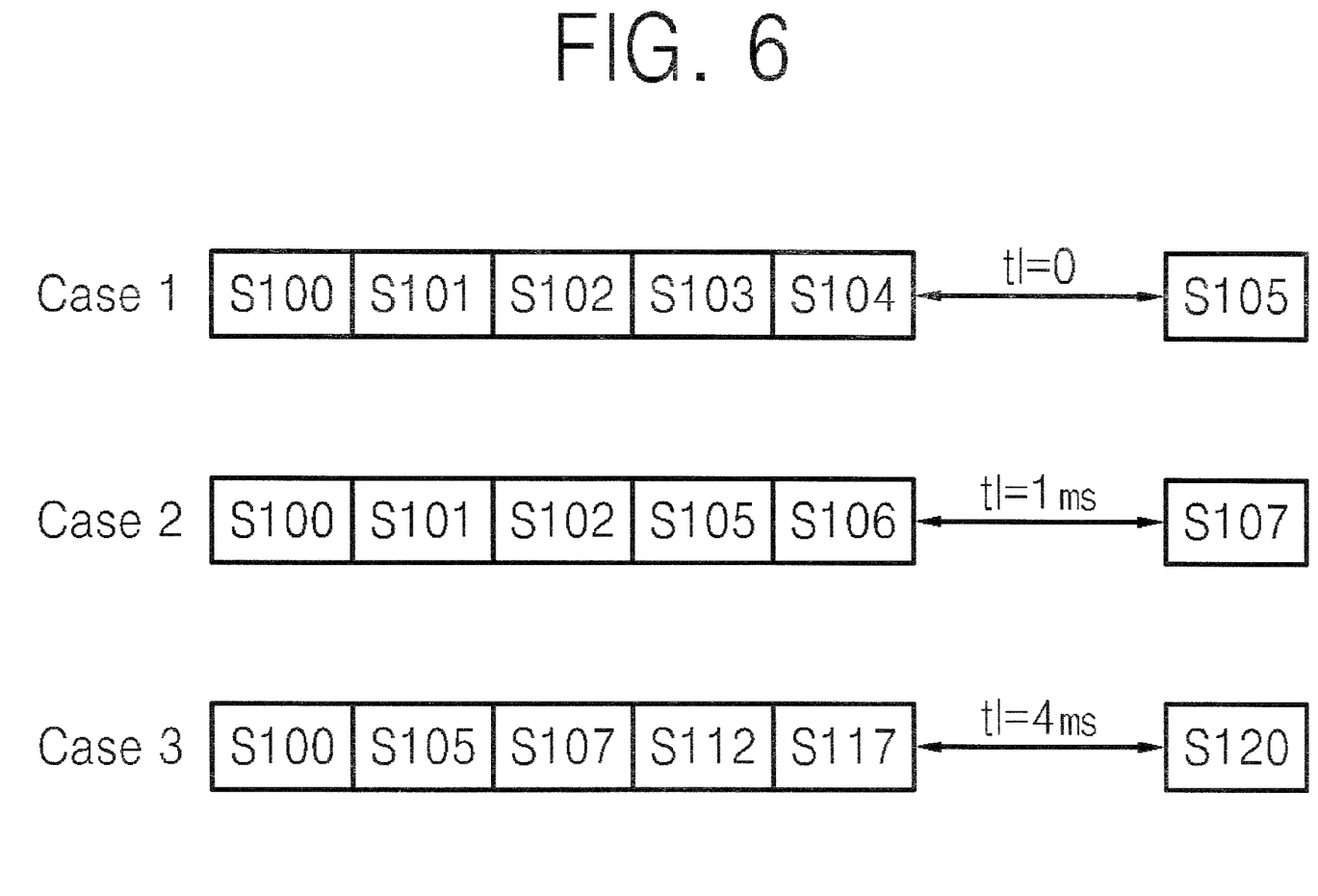
FIG. 6 is a diagram for explaining a process of adjusting a waiting time in the swapping method illustrated in FIG. 4, according to an exemplary embodiment of the present inventive concept.

FIG. 6 is a diagram for explaining a process of adjusting a waiting time in the swapping method illustrated in FIG. 4, according to an exemplary embodiment of the present inventive concept. Referring to FIG. 6, the first core adjusts a waiting time based on the continuity of a swap memory address included in each of the requests transmitted in advance of a next request. In other words, the waiting time decision module 128 determines the waiting time based on the continuity of the swap memory addresses, and the swap memory control module 126 transmits the next request based on the determined waiting time. This is done because a write speed of the swap memory 300 is affected by the continuity of the swap memory addresses.

Here, the swap memory address may correspond to a sector number, a page address or a physical address of where data is written.

In case 1 shown in FIG. 6, a swap memory address included in requests transmitted in advance of a next request (e.g., a rightmost-located request) is continuous. For example, when a leftmost-located request is a first transmitted request, a swap memory address included in each of five requests transmitted in advance of a sixth request is continuous. The first transmitted request requests the swap memory 300 to swap data to a sector 100 of the swap memory 300, a second request requests the swap memory 300 to swap data to a sector 101 of the swap memory 300, a third request requests the swap memory 300 to swap data to a sector 102 of the swap memory, a fourth request requests the swap memory 300 to swap data to a sector 103 of the swap memory and a fifth request requests the swap memory 300 to swap data to a sector 104 of the swap memory. Thus, a swap memory address included in each of the plurality of requests transmitted in advance of the sixth request is continuous. In this case, the waiting time decision module 128 may determine that a waiting time t1 is 0 s. When an address of the swap memory 300 which swaps data is continuous, the swap memory 300 may process the plurality of requests quickly. In other words, the swap control module 126 transmits new requests without a waiting time.

In case 2 shown in FIG. 6, a swap memory address included in a plurality of requests (e.g., those addressing sectors S100, S101, S102, S105 and S106 of the swap memory 300) transmitted in advance of a next request (e.g., that addressing sector 5107 of the swap memory 300) is partially discontinuous. In this case, the waiting time decision module 128 may determine that the waiting time t1 is 1 ms. This is done to secure enough time for the swap memory 300 to process the plurality of requests transmitted in advance of the next request. In other words, the swap control module 126 transmits a new request after waiting 1 ms.

In case 3 shown in FIG. 6, a swap memory address included in a plurality of requests (e.g., those addressing sectors S100, S105, S107, S112 and S117 of the swap memory 300) transmitted in advance of a next request (e.g., that addressing sector 5120 of the swap memory 300) is discontinuous. In this case, the waiting time decision module 128 may determine that the waiting time t1 is 4 ms. In other words, the swap control module 126 transmits a new requests after waiting 4 ms.

As mentioned above, the waiting time decision module 128 may determine the waiting time based on the continuity of the swap memory addresses included in prior transmitted requests.

Figure 7:
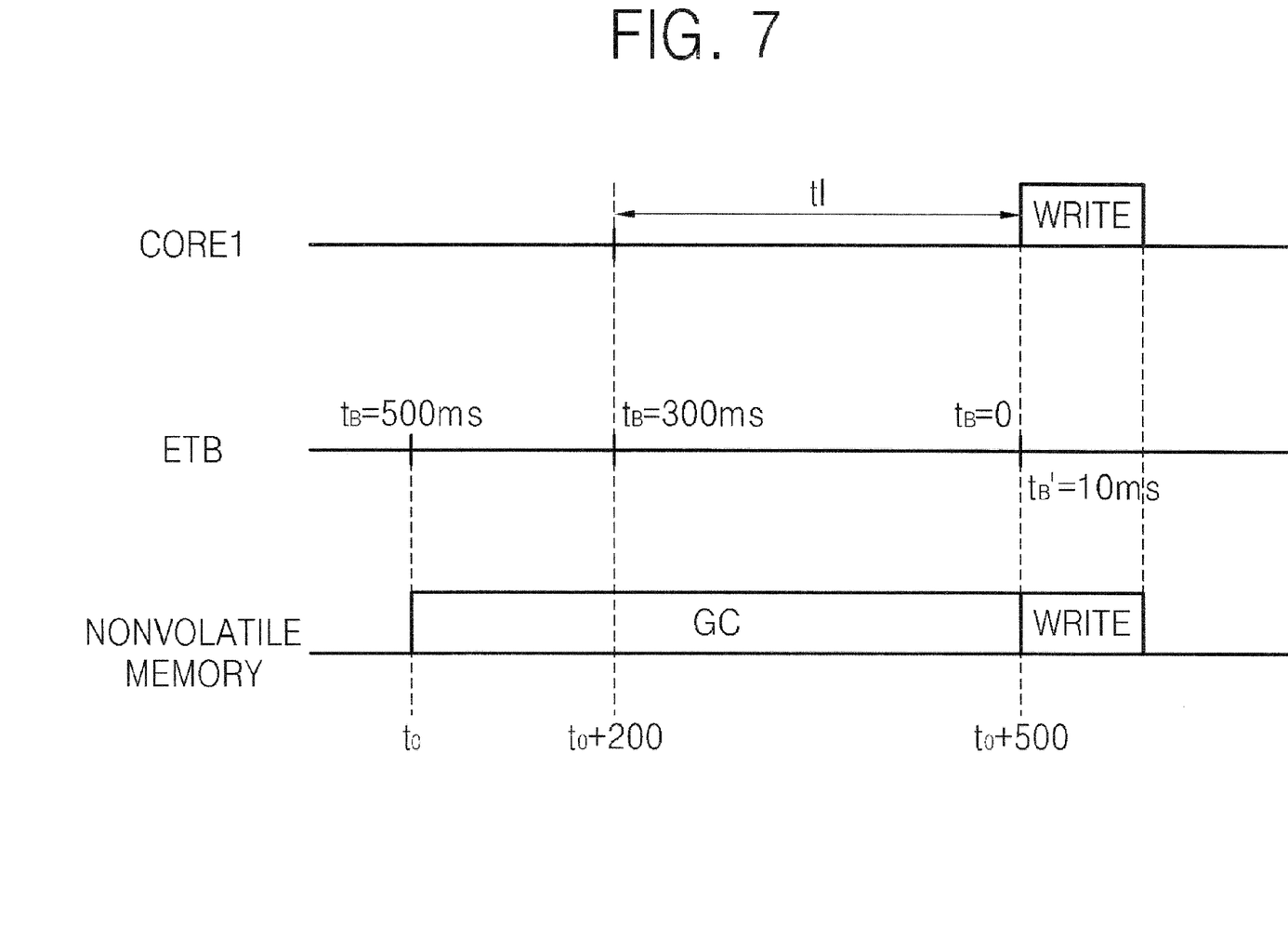
FIG. 7 is a diagram for explaining a process of adjusting a waiting time in the swapping method illustrated in FIG. 4, according to an exemplary embodiment of the present inventive concept.

FIG. 7 is a diagram for explaining a process of adjusting a waiting time in the swapping method illustrated in FIG. 4, according to an exemplary embodiment of the present inventive concept. Referring to FIG. 7, the first core may adjust a waiting time for transmitting a next request based on an expected busy time (ETB) output from the swap memory 300.

As shown in FIG. 7, the swap memory 300 may begin an unstoppable operation such as garbage collection at a time point t0. Here, the controller 340 estimates an expected busy time and stores the expected busy time in the register 380. In other words, the controller 340 may estimate the expected busy time based on the number of blocks selected during the garbage collection and the number of valid pages included in each block. Accordingly, the expected busy time (tB=500 ms) is stored in the register 380 at the time point t0. The expected busy time is then synchronized to a clock and decreased.

The first core at a time point t0+200 adjusts a waiting time for transmitting a next request based on an expected busy time (tB=300 ms) output from the swap memory 300. In other words, the swap control module 126 transmits a new request after waiting a time of 300 ms.

At a time point t0+500, the swap control module 126 transmits the new request to the swap memory 300, and the swap memory 300 writes or programs data of a page selected to be swapped to an empty page in response to the new request. Here, the controller 340 estimates a new expected busy time (tB=10 ms) and stores the estimated new expected busy time in the register 380.

A swapping method according to an exemplary embodiment of the present inventive concept may be embodied as a computer-readable program in a computer-readable recording medium. The computer-readable recording medium includes any kind of recording device where computer-readable data are stored. For example, the computer-readable recording medium can be a read only memory (ROM), a random access memory (RAM), a compact disc (CD) ROM, a magnetic tape, a floppy disk or an optical data storage device. In addition, the computer-readable recording medium can be distributed over network coupled computer systems so that the computer-readable program is stored and executed in a distributed fashion. Moreover, a functional program, a code and code segments to accomplish an exemplary embodiment of the present inventive concept may be construed by programmers skilled in the art to which the present inventive concept pertains.

A swapping method according to an exemplary embodiment of the present inventive concept may perform a swapping progress quickly by selecting, with at least one of a plurality of cores, a page to be swapped. In addition, by estimating a state of a swap memory, a swapping method according to an exemplary embodiment of the present inventive concept may adjust the speed of a write operation of the swap memory.

While the present inventive concept has been particularly shown and described with reference to exemplary embodiments thereof, it will be understood by those of ordinary skill in the art that various changes in form and detail may be made thereto without departing from the spirit and scope of the present inventive concept as defined by the following claims.

What is claimed is:

1. A swapping method performed using a data processing device, which includes a processor including a plurality of cores, a main memory and a swap memory, the swapping method comprising:

searching for an empty page of the swap memory, wherein the search is performed by using at least one core of the plurality of cores;

selecting a page to be swapped from the main memory of the data processing device, wherein the selection is performed by using the at least one core by accessing a corresponding main memory list among a plurality of main memory lists; and swapping data of the page selected to be swapped to the empty page, wherein the swapping is performed by using the at least one core, wherein when at least two requests to the swap memory are queued to the swap memory, transmitting a next request to the swap memory in accordance with a waiting time that is based on a continuity of a swap memory address included in each of the at least two requests, wherein the at least two requests and the next request are transmitted by using the at least one core.

2. The swapping method of claim 1, further comprising updating a page table storing information about the page selected to be swapped, wherein the updating is performed by using the at least one core.

3. The swapping method of claim 1, wherein at least one of the plurality of main memory lists is updated in a round robin method.

4. The swapping method of claim 1, wherein at least one of the plurality of main memory lists is a least recently used (LRU) list.

5. The swapping method of claim 1, wherein the swap memory is a flash memory and the waiting time is varied by addresses included in each of the at least two requests.

6. A swapping method performed using a data processing device, which includes a processor including a plurality of cores, a main memory and a swap memory, the swapping method comprising:
  searching for an empty page of the swap memory, wherein the search is performed by using at least one core of the plurality of cores;
  selecting a page to be swapped from the main memory of the data processing device, wherein the selection is performed by using the at least one core by accessing a corresponding main memory list among a plurality of main memory lists; and
  swapping data of the page selected to be swapped to the empty page, wherein the swapping is performed by using the at least one core,
  wherein the swapping comprises transmitting a request to the swap memory, and then, transmitting a next request to the swap memory, wherein the next request is transmitted in accordance with a waiting time that is based on an expected busy time output from the swap memory, wherein the two requests are transmitted by using the at least one core.

7. The swapping method of claim 1, wherein the swap memory is attachable or detachable to/from the data processing device.

8. The swapping method of claim 6, wherein the swap memory is a flash memory and the expected busy time is varied by one of a wear leveling and a garbage collection which is performed in the swap memory.

9. A data processing device, comprising:
  a main memory;
  a processor including a plurality of cores; and
  a swap memory coupled to the processor,
  wherein at least one core of the plurality of cores searches for an empty page of the swap memory, selects a page to be swapped from the main memory by accessing a corresponding main memory list among a plurality of main memory lists, and swaps data of the page selected to be swapped to the empty page,
  wherein the at least one core determines a waiting time and transmits a request to the swap memory to swap the data to the empty page in accordance with the waiting time, wherein the waiting time is based on a continuity of a swap memory address included in each of a plurality of requests transmitted in advance of the request.

10. The data processing device of claim 9, wherein at least one of the main memory lists is a least recently used (LRU) list.

11. The data processing device of claim 9, wherein at least one of the plurality of main memory lists is updated in a round robin method.

12. The data processing device of claim 9, wherein the swap memory is a flash memory and the waiting time is varied by addresses included in each of the requests.

13. A data processing device, comprising:
  a main memory;
  a processor including a plurality of cores; and
  a swap memory comprising a flash memory and coupled to the processor,
  wherein at least one core of the plurality of cores searches for an empty page of the swap memory, selects a page to be swapped from the main memory by accessing a corresponding main memory list among a plurality of main memory lists, and swaps data of the page selected to be swapped to the empty page,
  wherein the at least one core determines a waiting time and transmits a request to the swap memory to swap the data to the empty page in accordance with the waiting time, wherein the waiting time is based on an expected busy time output from the swap memory.

14. The data processing device of claim 13, wherein the swap memory is attachable or detachable to/from the data processing device.

15. The data processing device of claim 13, wherein the expected busy time is varied by one of a wear leveling and a garbage collection which is performed in the swap memory.

* * * * *